US008554624B2

(12) United States Patent
Kumhyr et al.

(10) Patent No.: US 8,554,624 B2
(45) Date of Patent: Oct. 8, 2013

(54) SYSTEM AND METHOD FOR ADVERTISING AND NEGOTIATING SERVICES FOR COMMERCIAL AND GENERAL AVIATION

(75) Inventors: David Bruce Kumhyr, Austin, TX (US); James Neal Andrews, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 2839 days.

(21) Appl. No.: 10/351,559

(22) Filed: Jan. 23, 2003

(65) Prior Publication Data

US 2004/0148179 A1 Jul. 29, 2004

(51) Int. Cl.
*G06Q 30/00* (2012.01)
(52) U.S. Cl.
USPC .................. 705/14.55; 705/14.62; 705/80
(58) Field of Classification Search
USPC .................... 705/14.55, 14.62, 80
See application file for complete search history.

(56) References Cited

U.S. PATENT DOCUMENTS

| 6,329,919 | B1* | 12/2001 | Boies et al. ................ 705/5 |
| 6,343,275 | B1 | 1/2002 | Wong .................... 705/26 |
| 6,526,335 | B1* | 2/2003 | Treyz et al. ................ 701/1 |
| 2001/0049636 | A1* | 12/2001 | Hudda et al. ................ 705/26 |
| 2002/0069293 | A1* | 6/2002 | Natalio .................... 709/238 |
| 2003/0004898 | A1* | 1/2003 | McAuliffe et al. ........ 705/80 |
| 2003/0192052 | A1* | 10/2003 | Frisco et al. ............ 725/76 |
| 2003/0233311 | A1* | 12/2003 | Bramnick et al. ........ 705/26 |

OTHER PUBLICATIONS

Beam et al., "Automated Negotiations: A Survey of the State of the Art", Fisher Center for Information Technology and Management, Walter A. Haas School of Business, University of California, Berkeley, CA, 1997, pp. 1-16.
Tamma et al., "An Ontology for Automated Negotiation", Sep. 25, 2002 http://choices.cs.uiuc.edu/agent/ubicomp/papers, pp. 1-9.

* cited by examiner

*Primary Examiner* — Michael Bekerman
(74) *Attorney, Agent, or Firm* — Yee & Associates, P.C.; Yenn Tham

(57) ABSTRACT

A system and method for advertising and negotiating services for commercial and general aviation are provided. A pilot of an aircraft may enter into a computing device specific information about a desired service the pilot wishes to have available upon arrival at an airport. This information is transmitted to an airport bartering system that barters with fixed based operator (FBO) computing systems at the airport for the desired services. The airport bartering system ranks the latest quotes from the FBOs based on criteria identified by the pilot in the original request. Advertisements for the top ranked FBOs are generated and transmitted to the aircraft computer system. The advertisements are displayed for viewing by the pilot. The pilot selects an advertisement, which generates an order for the desired service. The order is transmitted to the airport bartering system, which forwards the order to the FBO computer system associated with the selected advertisement.

16 Claims, 5 Drawing Sheets

SYSTEM AND METHOD FOR ADVERTISING AND NEGOTIATING SERVICES FOR COMMERCIAL AND GENERAL AVIATION

BACKGROUND OF THE INVENTION

1. Technical Field

The present invention is directed to a system and method for advertising and negotiating services for commercial and general aviation.

2. Description of Related Art

Typically, when a pilot is approaching an airport, the pilot may wish to call ahead to the airport to schedule services upon arrival at the airport. For example, if the pilot intends to continue the flight to another destination, the pilot may wish to purchase additional fuel for the remainder of the flight. Similarly, if the pilot is ferrying passengers, such as business passengers, the pilot may wish to schedule ground transportation to meet the passengers, food, lodging, and other accommodations. These services are typically provided by fixed base operators (FBOs) that are present at the airport or in close proximity to the airport.

Currently, the burden of knowing who to contact for a particular service is placed on the pilot. The pilot must know, or lookup in a flight guide, for example, which FBOs are operating at an airport and personally contact those FBOs using radio or cellular telephone communication. The pilot must then negotiate the sale of the services orally via radio or cellular communication.

Many times there may be a plurality of FBOs that provide a similar service at an airport. The present way of obtaining services makes it difficult for a pilot to negotiate the best deal amongst the plurality of FBOs offering similar services since it requires that the pilot personally contact each FBO and negotiate to obtain a best deal for the desired services. There is currently no mechanism available for the automatic identification of FBOs and negotiation of the sale of services.

In view of the above, it would be beneficial to have a system and method for advertising and negotiating services for commercial and general aviation. It would further be beneficial to have a system and method by which a pilot may enter information regarding services desired and automatically obtain advertisements of currently available deals on the desired services from FBOs at the airport.

SUMMARY OF THE INVENTION

The present invention provides a system and method for advertising and negotiating services for commercial and general aviation. With the present invention, a pilot of an aircraft may enter into a computing device specific information about a desired service that the pilot wishes to have available upon arrival at a destination airport. This information is then transmitted to an airport bartering system that barters with fixed based operator (FBO) computing systems at the airport for the desired services.

For example, the airport bartering system identifies which FBOs are present at the airport that offer the desired service. The airport bartering system then sends a request for a quote on the desired service to each of the identified FBO's computer systems. The FBO computer systems then return a quote for the desired service to the airport bartering system. The airport bartering system may then perform automatic negotiation between the FBO computer systems based on the received quotes to obtain a best deal for the desired service.

Once the airport bartering system determines that a better deal on the desired service is not obtainable, the airport bartering system ranks the latest quotes from the FBOs based on criteria identified by the pilot in the original request for the desired service. Advertisements for the top ranked FBOs are then generated and transmitted to the aircraft computer system from which the request for services was sent. The advertisements may include textual and graphical elements identifying the FBO and the terms of the offer for sale of the desired service.

The advertisements received at the aircraft computer system are displayed on an associated display for viewing by the pilot. The pilot may then select an advertisement in order to generate an order for the desired service. The order for the desired service is then transmitted to the airport bartering system which then forwards the order to the FBO computer system associated with the FBO of the selected advertisement.

These and other features will be described in, or will become apparent to those of ordinary skill in the art in view of, the following detailed description of the preferred embodiments.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
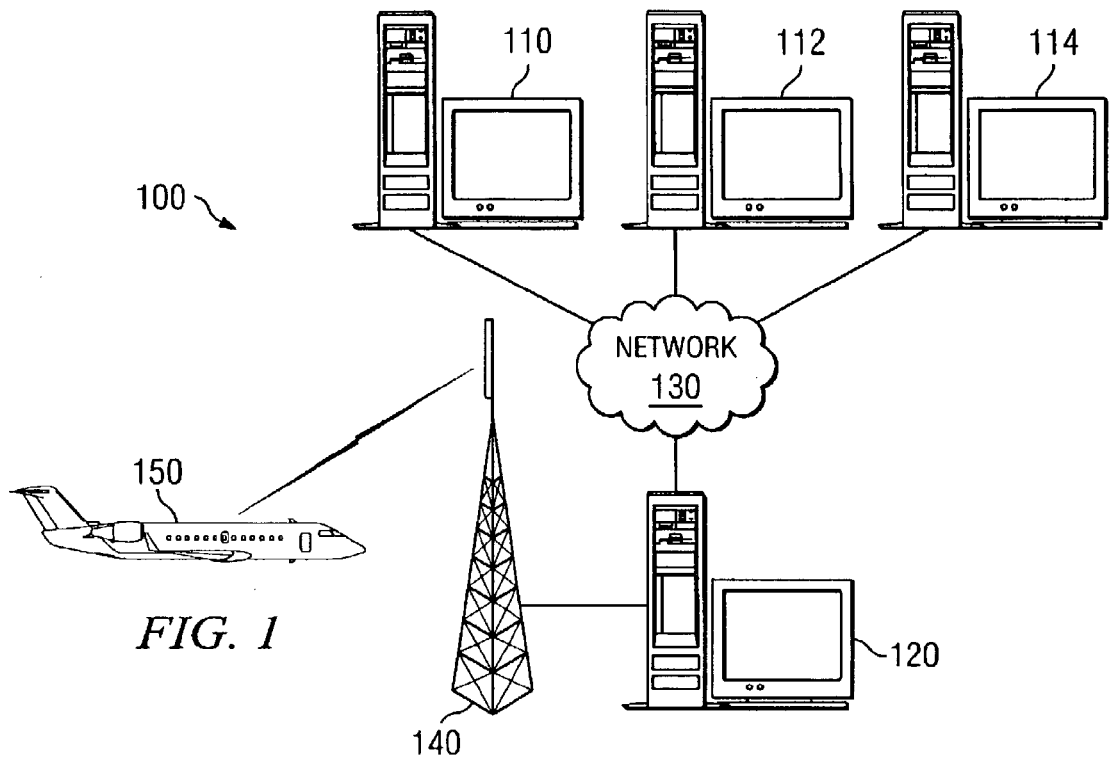
FIG. 1 is an exemplary block diagram of an airport services advertising and negotiation system according to the present invention.

With reference now to the figures, FIG. 1 is an exemplary block diagram of an airport services advertising and negotiation system according to the present invention. As shown in FIG. 1, the system 100 includes a plurality of fixed based operator (FBO) computer systems 110-114 associated with FBOs that offer services at an airport. These services may include, for example, fuel, food, lodging, ground transportation, and any other service that may be offered to a pilot or passengers of an aircraft.

A network 130 couples the plurality of FBO computer systems 110-114 to an airport bartering system 120. The network 130 may be any local area network or combination of local area networks through which data may be transmitted. The network 130 may be wired or wireless and may be a combination of two or more networks of the same or different types. Examples of network 130 include a Bluetooth based network, an Ethernet based network, a TCP/IP based network, or the like.

The airport bartering system 120 is further coupled to a wireless transceiver 140. The airport bartering system 120 receives requests for services from computing devices associated with aircraft, such as aircraft 150, and sends advertisements of FBOs and their offers of sale to the aircraft via the wireless transceiver 140. The wireless transceiver may make use of any wireless communication medium including cellular communication, radio communication, satellite communication and the like.

The computing device on board the aircraft 150 may be any type of computing device that is capable of receiving input from a user and transmitting data via a wireless transceiver to the airport bartering system 120. For example, the computing device may be an on board computer permanently affixed to the aircraft, a portable computer, a laptop computer, a personal digital assistant, or the like.

With the present invention, a pilot of the aircraft 150 may enter into a computing device associated with the aircraft specific information about a desired service that the pilot wishes to have available upon arrival at a destination airport. For example, the pilot may wish to schedule ground transportation to be available for his/her passengers, refueling of the aircraft, lodging for his/her passengers, food service, and the like. Moreover, the pilot may wish to negotiate with one or more FBOs for providing of the service in order to obtain the most acceptable deal on the sale of the service.

The computing device used by the pilot is preferably equipped with an airport services request and selection device which may be implemented in hardware, software or any combination of hardware and software. The airport services request and selection device provides one or more graphical user interfaces (GUIs) through which the pilot may enter information about the services that the pilot wishes to schedule at a destination airport. For example, the GUIs may include a first GUI for selection of the type of service desired and a second GUI for input of required service information for the particular service type selected.

This service information is then transmitted to an airport bartering system that barters with fixed based operator (FBO) computing systems at the airport for the desired services. That is, the airport bartering system maintains a directory of FBOs that are associated with the airport along with the services that they offer. Based on the selection of service type, and possibly one or more parameters of the service, entered by the pilot and transmitted to the airport bartering system, the airport bartering system may search the directory of FBOs to identify a set of FBOs that provide the desired service. For example, if the pilot requested ground transportation, and specifically, limo service, the airport bartering system may identify Al's Limo Service and DFW Limo Service as being FBOs associated with the airport and providing the desired service.

Once the FBOs associated with the airport and providing the desired service are identified, the airport bartering system sends a request for a quote on the desired service to each of the identified FBO's computer systems. The FBO computer systems may determine a quote based on current terms of sale of the service being offered by the FBO and return the quote for the desired service to the airport bartering system. The airport bartering system may then perform automatic negotiation between the FBO computer systems based on the received quotes to obtain a best deal for the desired service. Such generation of quotes and negotiation between computer systems is generally known in the art of business-to-business e-commerce over the Internet, although it has not been applied to airport services in the manner of the present invention. For example, U.S. Pat. No. 6,343,275 to Charles Wong, entitled "Integrated Business-to-Business Web Commerce and Business Automation System", issued Jan. 29, 2002 describes a business-to-business system in which quotes for sale of products and services are automatically generated by agent computer systems. Automated negotiations are described, for example, in "Automated Negotiations: A Survey of the State of the Art" by Carrie Beam and Arie Segev, Fisher Center for Information Technology & Management, Walter A. Haas School of Business, University of California, Berkley, 1997. A specific automated negotiation system in which negotiation protocol is expressed in terms of a shared ontology is described in "An Ontology for Automated Negotiation" by Tamma et al., 2002, available at http://choices.c-s.uiuc.edu/agent/ubicomp/papers/anontology-for-automated.pdf.

The negotiation between the airport bartering system and the FBO computer systems may be governed by negotiation parameters set by the pilot and transmitted with the original request for service. For example, the pilot may wish to negotiate for the lowest cost, the best delivery time, may designate a preferred FBO, or the like. These parameters may govern how the airport bartering system negotiates with each FBO to obtain a quote that best fits the desires of the pilot. For example, the type of aircraft itself may be a parameter that governs how the airport bartering system negotiates with each FBO.

For example, if a Beechcraft King Air airplane were the source of a request for services including a hanger to store the aircraft indoors, then the size of the aircraft is a factor in determining whether a FBO responds to the negotiation requests. That is, while the FBO may offer hangers for storing of aircraft, the FBO may not have a hanger large enough, or a currently available capacity, to store an aircraft the size of a Beechcraft King Air. As a consequence, the FBO may not continue with negotiations to provide the requested service.

The negotiation between the airport bartering system and the one or more FBO computer systems may continue until a better quote is not obtainable from any of the one or more FBO computer systems. Once the airport bartering system determines that a better deal on the desired service is not obtainable, the airport bartering system ranks the latest quotes from the FBOs based on criteria identified by the pilot in the original request for the desired service. For example, if the original request for service received from an aircraft computer system indicates that the pilot wishes to obtain a lowest cost for the requested service, the quotes received from the FBOs may be ranked based on quoted cost.

Advertisements for the top ranked FBOs are then generated and transmitted to the aircraft computer system from which the request for services was sent. The top ranked FBOs are determined based on predetermined criteria, such as a display size of the aircraft computer system from which the request was received, e.g., only 3 advertisements may be displayed at one time on a display of the aircraft computer system and thus, the top ranked FBOs are the top three FBOs. The advertisements may include textual and graphical elements identifying the FBO and the terms of the offer for sale of the desired service. Text and graphical elements for the advertisements may be received from the FBO computer systems or may be retrieved from a storage device associated with the airport bartering system, such as the FBO directory storage device.

The advertisements received at the aircraft computer system are displayed on an associated display for viewing by the pilot. The pilot may then select an advertisement in order to generate an order for the desired service. The pilot may select and advertisement using any known input device including keyboard, pointing device, touch screen or touch pad, voice recognition, or the like.

The order may include a designation of the service desired along with the terms of sale offered by the FBO and personal information regarding the entity that will provide compensation for the service. This may include payment details such as name of the entity to be billed, account number, billing address, and the like. The order is generated electronically and transmitted to the airport bartering system which then forwards the order to the FBO computer system associated with the FBO of the selected advertisement. The FBO will then arrange to provide the service in accordance with the terms agreed to by submission of the order.

Thus, the present invention provides a computerized mechanism for submitting a request for airport services, negotiating the terms of sale of the services with one or more FBOs, and placing an order for the services. The present invention eliminates the need for the pilot to have prior knowledge of the FBOs operating at a particular airport and the capabilities of each FBO to provide a particular service. The present invention further eliminates the requirement that the pilot personally contact the FBO to negotiate the sale of a particular service.

Figure 2:
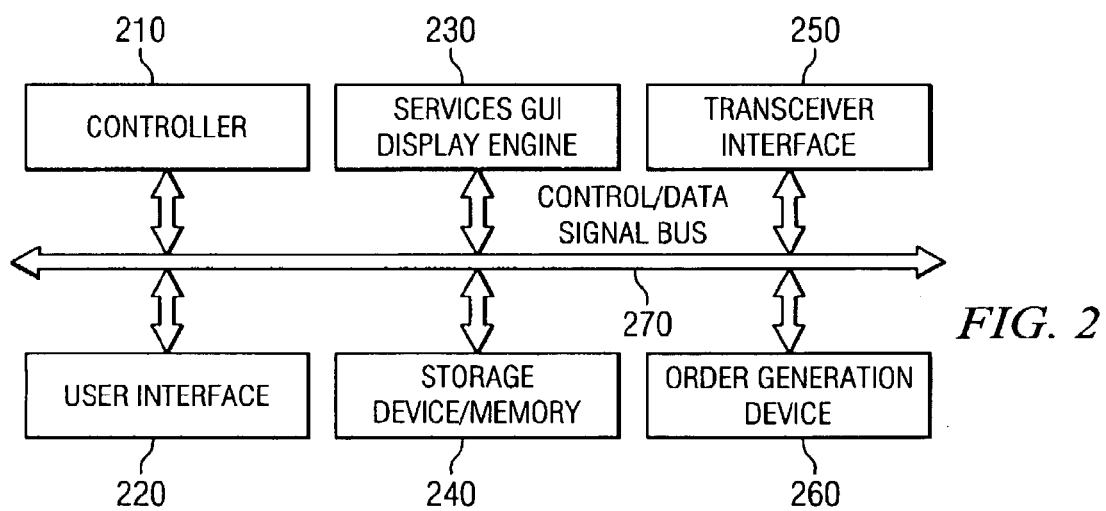
FIG. 2 is an exemplary block diagram of an airport services request and selection device according to the present invention.

FIG. 2 is an exemplary block diagram of an airport services request and selection device according to the present invention. The airport services request and selection device shown in FIG. 2 may be implemented in hardware, software, or any combination of hardware and software without departing from the spirit and scope of the present invention. In a preferred embodiment, the airport services request and selection device is implemented as software instructions executed by one or more processors.

The airport services request and selection device shown in FIG. 2 may be integrated into a computer system associated with an aircraft. For example, the airport services request and selection device may be integrated into an on board computer system of an aircraft, a laptop computer, a portable computer, a personal digital assistant, or the like. Furthermore the airport services request and selection device may be loaded onto a computer device such as that described above, as one or more applications from a storage medium.

As shown in FIG. 2, the airport services request and selection device includes a controller 210, a user interface 220, an airport services GUI display engine 230, a storage device/memory 240, a transceiver interface 250, and an order generation device 260. These elements are in communication with one another via the control/data signal bus 270. Although a bus architecture is shown in FIG. 2, the present invention is not limited to such and any architecture that facilitates the transfer of control/data signals between the elements 210-260 may be used without departing from the spirit and scope of the present invention.

The controller 210 controls the overall operation of the airport services request and selection device and orchestrates the operation of the other elements 220-260. The user interface 220 provides an interface through which user input for designating desired services, specifics about the desired service, display of FBO advertisements, selection of a FBO advertisement, and the like. The airport services GUI display engine 230 generates the various GUIs used to input specific details regarding the desired service, the display of FBO advertisements, and input of a selection of an FBO advertisement. The storage device/memory 240 provides a temporary storage area for service request data, order data, FBO advertisement data, and the like. The transceiver interface 250 provides an interface for the transmission and reception of data to and from an airport bartering system. The order generation device 260 generates an order for services based on the selection of an FBO advertisement by the user.

In operation, the user may initiate the airport services request and selection device by providing an input via the user interface 220. The controller 210 then instructs the airport services GUI display engine 230 to generate one or more GUIs to receive the specific details of the desired service from the user via the user interface 220. The airport services GUI display engine 230 then outputs the GUIs via the user interface 220 and receives the input from the user which is stored in the storage device/memory 240.

In response to receiving an input from the user to transmit the request for services, the controller 210 reads the service request data stored in the storage device/memory 240 and transmits it to the airport bartering system via the transceiver interface 250. Thereafter, the controller 210 receives advertisements of FBOs providing the desired service via the transceiver interface 250 and stores these advertisements in the storage device/memory 240. The controller 210 outputs the advertisements and receives a selection of an advertisement via the user interface 220.

In response to receiving a selection of an FBO advertisement, the controller 210 instructs the order generation device 260 to generate an order for the desired service from the selected FBO. The generation of the order may require additional input from the user via the user interface 220 and/or retrieval of billing or other information stored, for example, in the storage device/memory 240. The order, once generated, is stored in the storage device/memory 240 and then transmitted to the airport bartering system via the transceiver 250.

Figure 3:
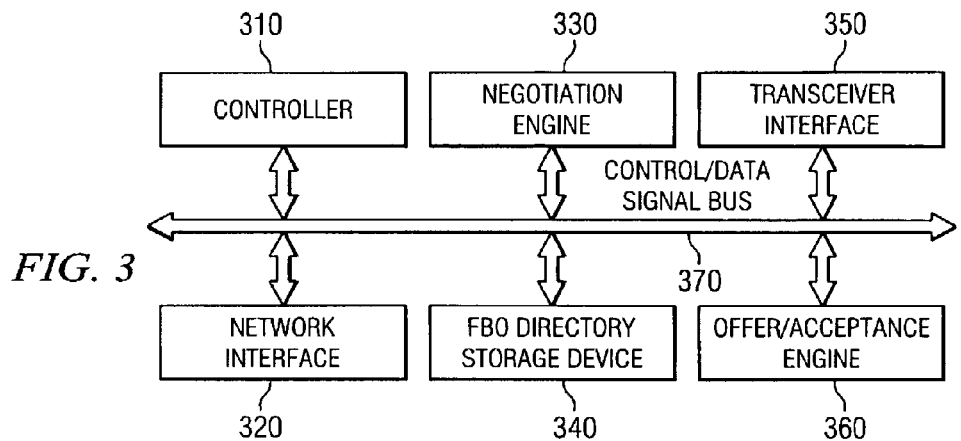
FIG. 3 is an exemplary block diagram of an airport bartering system according to the present invention.

FIG. 3 is an exemplary block diagram of an airport bartering system according to the present invention. The airport bartering system shown in FIG. 3 may be implemented in hardware, software, or any combination of hardware and software without departing from the spirit and scope of the present invention. In a preferred embodiment, the airport bartering system is implemented as software instructions executed by one or more processors.

As shown in FIG. 3, the airport bartering system includes a controller 310, a network interface 320, a negotiation engine 330, a FBO directory storage device 340, a transceiver interface 350, and an offer/acceptance engine 360. These elements are in communication with one another via the control/data signal bus 370. Although a bus architecture is shown in FIG. 3, the present invention is not limited to such and any architecture that facilitates the communication of control/data signals between the elements 310-360 may be used without departing from the spirit and scope of the present invention.

The controller 310 controls the overall operation of the airport bartering system and orchestrates the operation of the other elements 320-360. The network interface 320 provides an interface to a local area network for communication with FBO computer systems The negotiation engine 330 performs negotiation operations with FBO computer systems to obtain a best deal for services. The FBO directory storage device 340 stores a directory of the FBOs that are currently associated with the airport and which may negotiate to offer services to pilots and passengers of aircraft arriving at the airport. The transceiver interface 350 provides an interface for sending and receiving data to and from aircraft associated computer systems. The offer/acceptance engine 360 receives quotes from FBO computer systems and generates advertisements for display on aircraft associated computer systems. The offer/acceptance engine 360 further receives orders from aircraft associated computer systems and provides those orders to appropriate FBO computer systems.

In operation, the controller 310 receives a request for services via the transceiver 350 and performs a search of the FBO directory storage device 340 for one or more FBOs that offer the service requested. The controller 310 then issues a request for quotes from each of the identified FBO computer systems via the network interface 320. The controller 310 then receives quotes from the FBO computer systems and instructs the negotiation engine 330 to negotiate with the FBO computer systems to obtain the best deal for the services in accordance with negotiation parameters set forth in the request for service.

Once a better quote is not obtainable from the FBO computer systems, the controller 310 ranks the quotes according to the negotiation criteria and instructs the offer/acceptance engine 360 to generate advertisements with the specific terms of each quote included therein. The offer/acceptance engine 360 then transmits these advertisements to the aircraft associated computer system via the transceiver 350.

At some time later, the offer/acceptance engine 360 may receive an order from the aircraft associated computer system via the transceiver 350. The offer/acceptance engine 360 then provides the order to the appropriate FBO computer system via the network interface 320.

Figure 4A:
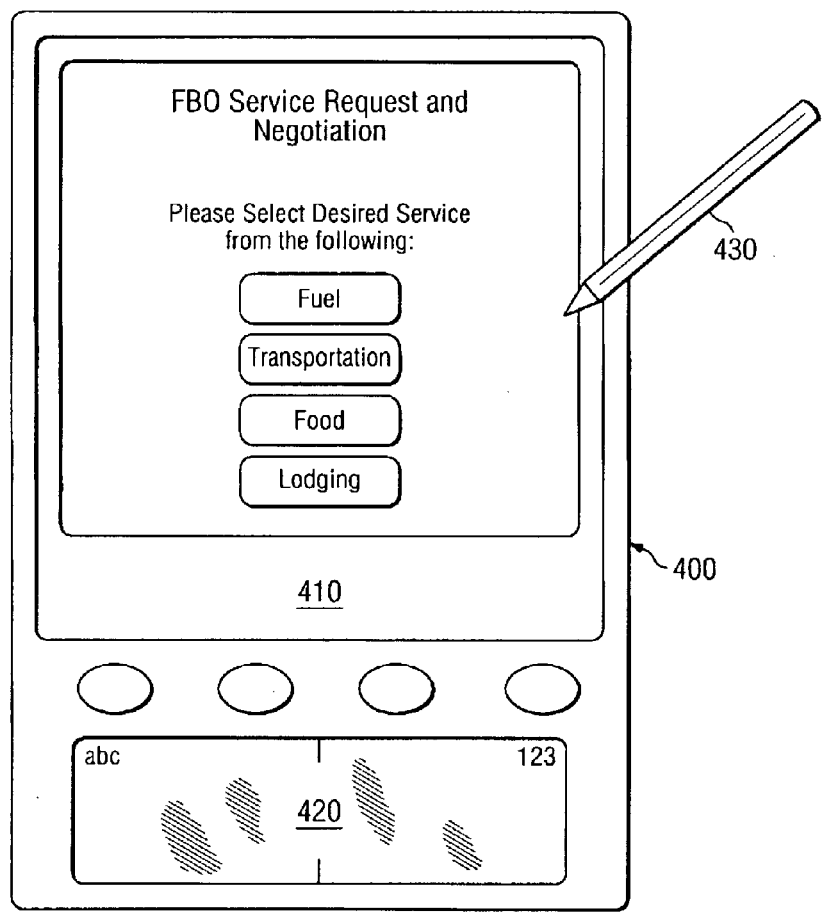
FIGS. 4A-4B are exemplary diagrams of graphical user interfaces used to enter criteria for a requested service using an airport services request and selection device.
Figure 4B:
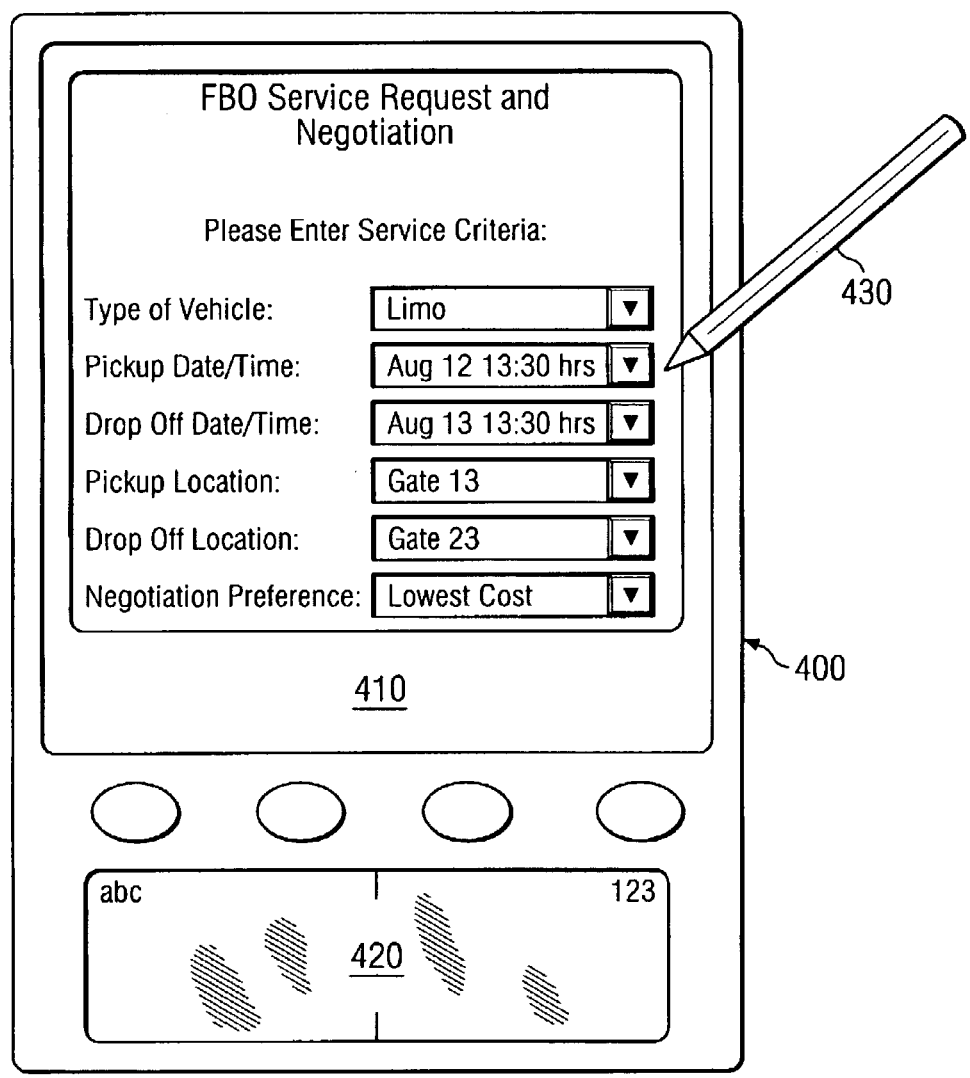

FIGS. 4A-4B are exemplary diagrams of graphical user interfaces used to enter criteria for a requested service using an airport services request and selection device. The particular computing device depicted in FIGS. 4A-4B is a personal digital assistant, although other computing devices may be used to implement the airport services request and selection device, as discussed above.

As shown in FIG. 4A, the personal digital assistant (PDA) 400 includes a display portion 410 and an input portion 420. The display portion 410 is touch sensitive and displayed items, such as fields, virtual buttons, and the like, may be selected by touching the display portion 410 using the stylus 430 in an area close to the displayed item. In addition, input of alphanumeric characters and the like may be entered through use of the stylus 430 with the input portion 420, as is generally known in the art.

In the depicted example, the PDA 400 currently has displayed in the display portion 410 an initial GUI of the airport services request and selection device in which a user may select the type of service that he/she wishes to schedule. For example, these services may include a fuel service, ground transportation service, food service, lodging service, and the like. The user may select the service type that he/she is interested in by touching the display portion 410 in an area near the virtual button for the desired service using the stylus 430.

Upon selection of one of the service types displayed, subsequent GUIs are displayed for the entry of service specific information identifying the particular details of the service desired. FIG. 4B illustrates one such subsequent GUI in which ground transportation details are entered. As shown in FIG. 4B, the details may be entered via fields in the GUI which may take the form of text fields, drop down menus, selection boxes, or any of a number of other known GUI input mechanisms.

Figure 5:
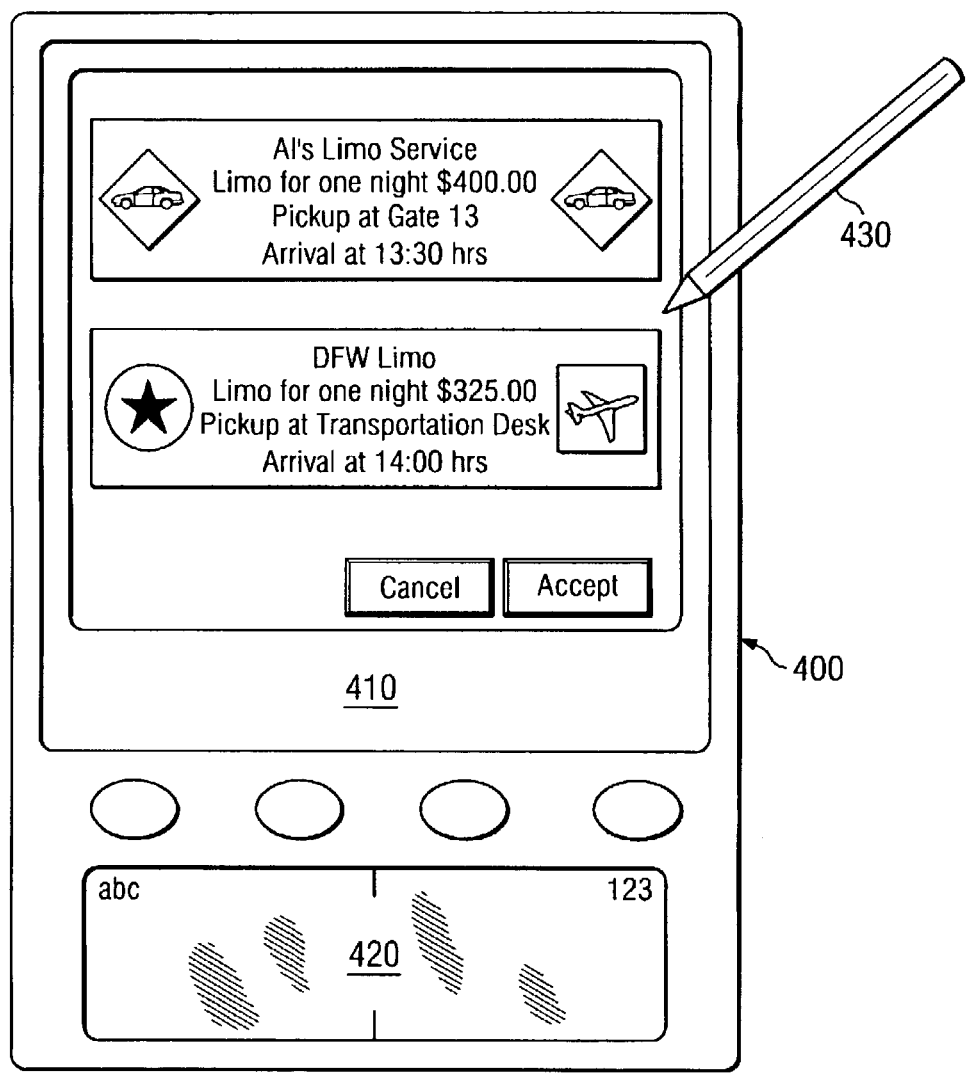
FIG. 5 is an exemplary diagram illustrating displayed advertisements obtained from an airport bartering system in accordance with the present invention.

Upon entry of the specifics of the service desired, the computing device transmits the request for services to the airport bartering system. The airport bartering system may return advertisements of FBOs that provide the requested service along with the details of the terms of sale for the requested service. FIG. 5 illustrates an example display of FBO advertisements with terms of sale displayed. As shown in FIG. 5, advertisements having textual and graphical elements may be displayed. In addition, the specifics of the service that may be provided by the FBO are also displayed. For example, Al's Limo Service can offer the limo service requested using the specifics of FIG. 4B for $400.00, can pickup the passengers at gate 13 and will arrive at the gate at 13:30 hours. DFW Limo on the other hand, can provide the requested service for $325.00, can pickup the passengers at the transportation desk and will arrive at the transportation desk at 14:00 hours. From these details, the user may determine which option is best for him/her and select the appropriate advertisement.

Figure 6:
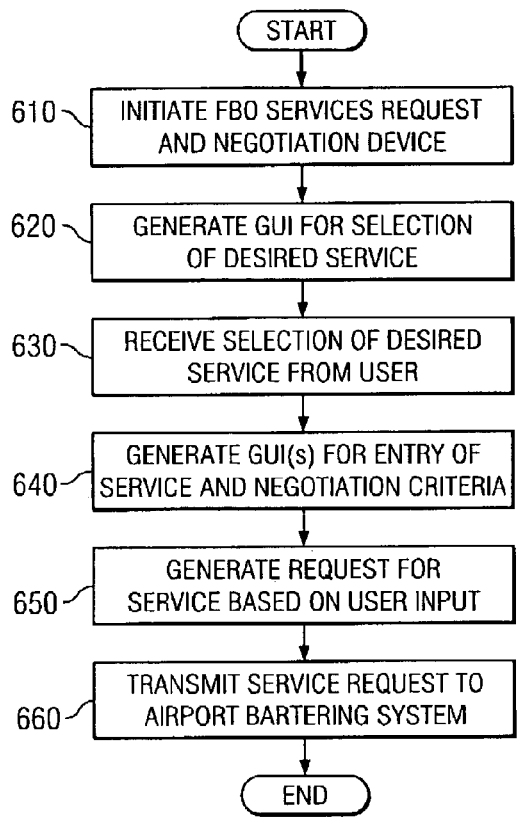
FIG. 6 is a flowchart outlining an exemplary operation of an airport services request and selection device.

FIG. 6 is a flowchart outlining an exemplary operation of an airport services request and selection device. As shown in FIG. 6, the operation starts with the initiation of the FBO services request and selection device (step 610). A GUI for selection of desired service is then generated (step 620) and output. Thereafter, selection of a desired service is received from the user (step 630).

Subsequently, one or more GUIs are generated and displayed for entry of service and negotiation criteria (step 640). Entries into these GUIs are obtained from the user to generate a request for service (step 650). The service request is then transmitted to an airport bartering system (step 660).

Figure 7:
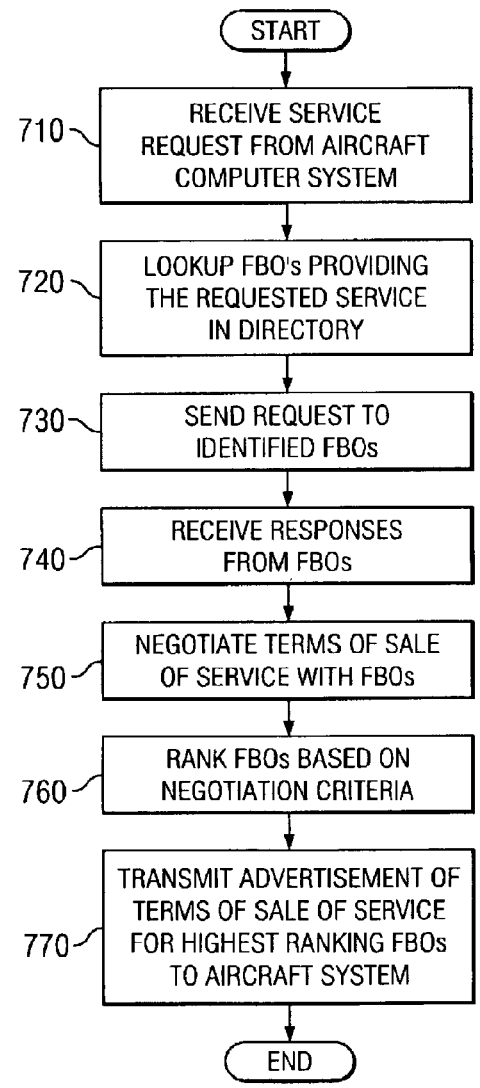
FIG. 7 is a flowchart outlining an exemplary operation of an airport bartering system in accordance with the present invention.

FIG. 7 is a flowchart outlining an exemplary operation of an airport bartering system in accordance with the present invention. As shown in FIG. 7, the operation starts with a request for service being received from an aircraft computer system (step 710). The airport bartering system then looks up the FBOs providing the requested service in an FBO directory (step 720) and sends a request to the identified FBOs' computer systems (step 730).

Thereafter, responses are received from the FBO computer systems (step 740). The airport bartering system then negotiates terms of sale of service with each FBO computer system until no further improvement of the offers for sale is obtained (step 750). The quotes from the FBOs are then ranked according to the negotiation criteria indicated in the request for service (step 760) and advertisements for the FBOs are generated and transmitted for the top ranking FBOs (step 770).

Figure 8:
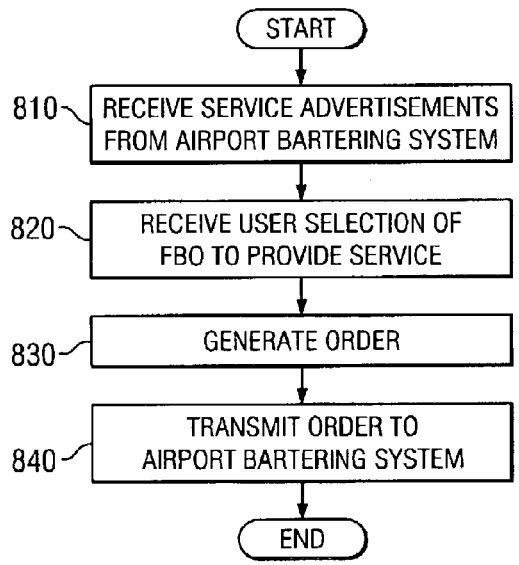
FIG. 8 is a flowchart outlining an exemplary operation of an airport services request and selection device when generating an order for services.

FIG. 8 is a flowchart outlining an exemplary operation of an airport services request and selection device when generating an order for services. As shown in FIG. 8, the operation starts with receiving FBO advertisements from an airport bartering system (step 810). A selection of an FBO advertisement is received from the user (step 820) and an order is generated (step 830). The order is then transmitted to the airport bartering system (step 840).

Thus, the present invention provides a computer system for requesting a quote on services from, negotiating with, and selecting an FBO to provide services to a pilot or passenger of an aircraft. With the present invention, the burden of contacting and negotiating with an FBO is shifted from the pilot to an automated system with the pilot only having to enter the criteria for the service desired and select the particular FBO he/she wishes to provide the service. The actual mechanics of identifying which FBOs are available at a particular airport and which ones provide the required service, along with contacting each one and negotiating a best deal, are all automated with the present invention.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for bartering for a service from a fixed base operator associated with an airport, the method comprising:
    connecting a hand-held computing device, aboard an aircraft that is airborne and en-route to the airport, to a plurality of computing systems of a plurality of fixed base operators associated with the airport;
    entering a transportation request, by a pilot of the aircraft, at a graphical user interface displayed on the hand-held computing device, wherein the transportation request is entered by selecting a type of vehicle, a pickup date and time, a drop off date and time, a gate of the airport for a pick up location, the gate or another gate of the airport for a drop off location, and a negotiation preference, using a plurality of pre-configured drop down menus and a touch screen functionality of the graphical user interface;
    identifying, by a processor unit of the hand held computing device, one or more fixed base operators, of the plurality of fixed base operators associated with the airport, that provide a plurality of services responsive to transportation requests;
    transmitting, by the processor unit, a request for a quote on providing the plurality of services to each computing system of the one or more fixed base operators; and
    automatically negotiating, by the processor unit, with each computing system of the one or more fixed base operators based on one or more negotiation criteria until the processor unit determines a better deal on the plurality of services will not be obtained.

2. The method of claim 1, wherein the one or more negotiation criteria are identified in the transportation request.

3. The method of claim 1, further comprising:
    responsive to a determination by the processor unit that the better deal on the plurality of services is not obtainable, ranking quotes from the one or more fixed base operators based on the one or more negotiation criteria; and
    transmitting one or more advertisements for a subset of the one or more fixed base operators based on the ranking of quotes.

4. The method of claim 3, wherein the one or more advertisements include information obtained from the quotes from the one or more fixed base operators.

5. The method of claim 3, further comprising:
    receiving an order for service from the computer associated with the aircraft transportation request based on a selection of an advertisement from the one or more advertisements; and
    transmitting the order to a fixed base operator identified in the order.

6. The method of claim 1, wherein identifying the one or more fixed base operators includes performing a lookup of the plurality of fixed base operators in a fixed base operator directory based on a type of requested service.

7. The method of claim 1, wherein the one or more negotiation criteria include at least one of a lowest cost, a best delivery time, a preferred fixed base operator, and a type of transportation.

8. A method, in a data processing system, for bartering for a service from a fixed base operator associated with an airport, the method comprising:
    connecting a hand-held computing device, aboard an aircraft that is airborne and en-route to the airport, to a plurality of computing systems of a plurality of fixed base operators associated with the airport;
    displaying a graphical user interface on the hand-held computing device;
    receiving, at the graphical user interface, a transportation request, entered by a selection of a type of vehicle, a pick up date and time, a drop off date and time, a gate of the airport for a pickup location, the gate or another gate of the airport for a drop off location, and a negotiation preference, using a plurality of pre-configured drop down menus and a touch screen functionality of the graphical user interface;
    identifying, by a processor of the hand held computing device, one or more fixed base operators, of the plurality of fixed base operators associated with the airport, that provide a plurality of services responsive to a transportation request;
    transmitting a request for a quote on providing the plurality of services to each computing system of the one or more fixed base operators, wherein the request for the quote includes one or more negotiation criteria; and
    receiving, from each computing system of one or more quotes on providing the plurality of services, wherein the one or more quotes received are ranked based on the one or more negotiation criteria.

9. A computer program product having computer usable program code stored in a non-transitory computer recordable medium for bartering for a service from a service provider associated with an airport, the computer usable program code when executed by a processor performs the following steps:
    connecting a hand-held computing device, aboard an aircraft that is airborne and en-route to the airport, to a plurality of computing systems of a plurality of fixed base operators associated with the airport;
    displaying a graphical user interface on the hand-held computing device;
    receiving, at the graphical user interface, a transportation request, entered by a selection of a type of vehicle, a pick up date and time, a drop off date and time, a gate of the airport for a pickup location, the gate or another gate of the airport for a drop off location, and a negotiation preference, using a plurality of pre-configured drop down menus and a touch screen functionality of the graphical user interface;
    identifying, by a processor of the hand held computing device, one or more fixed base operators, of the plurality of fixed base operators associated with the airport, that provide a plurality of services responsive to a transportation request;
    transmitting a request for a quote on providing the plurality of services to each computing system of the one or more fixed base operators, wherein the request for the quote includes one or more negotiation criteria; and receiving, from each computing system, one or more quotes on providing the plurality of services, wherein the one or more quotes received are ranked based on the one or more negotiation criteria.

10. The computer program product of claim 9, wherein the negotiation criteria are identified in the transportation request.

11. The computer program product of claim 9, wherein the computer usable program code further executes the steps of:
responsive to a determination that the better deal on the transportation request is not obtainable, ranking a plurality of quotes from the one or more fixed base operators based on one or more criteria; and
transmitting one or more advertisements for a subset of the one or more fixed base operators based on the ranking of the plurality of quotes.

12. The computer program product of claim 11, wherein the one or more advertisements include information obtained from the plurality of quotes.

13. The computer program product of claim 12, wherein the computer usable program code further executes the steps of:
receiving an order for service from the hand held computing device based on a selection of an advertisement from the one or more advertisements; and
transmitting the order to a fixed base operator identified in the order.

14. The computer program product of claim 9, wherein the computer usable program code for executing the step of identifying the one or more fixed base operators includes computer usable program code for performing a lookup of the plurality of fixed base operators in a service provider directory based on a type of requested service.

15. An apparatus for bartering for a service from a fixed base operator associated with an airport, the apparatus comprising:
a hand held computing device having a processor; and
a storage device connected to the hand held device, wherein instructions are stored on the storage device, the instructions configured to perform, by the processor, actions comprising:
connecting the hand-held computing device, aboard an aircraft that is airborne and en-route to the airport, to a plurality of computing systems of a plurality of fixed base operators associated with the airport;
displaying a service request and negotiation graphical user interface on the hand-held computing device, the service request and negotiation graphical user interface having a plurality of pre-configured drop down menus and a touch screen functionality;
receiving a plurality of entries at the graphical user interface for a transportation request, wherein the transportation request is entered by a plurality of inputs using the touch screen functionality, the plurality of inputs comprising a type of vehicle, a pick up date and time, a drop off date and time, a gate of the airport for a pickup location, a gate of the airport for a drop off location, and a negotiation preference;
identifying one or more fixed base operators associated with the airport that provide the type of requested service
transmitting a request for a quote on for fulfilling the transportation request into each computing system of the one or more fixed base operators associated with the airport that provide the transportation request; and
instructing the negotiation engine to automatically negotiate with each computing system of the one or more fixed base operators based on one or more negotiation criteria until the controller determines a better deal on the transportation request is not obtainable.

16. A method, in a data processing system, for bartering for a service from a fixed base operator associated with an airport, the method comprising:
connecting a hand-held computing device aboard an aircraft, that is airborne and en-route to the airport, to a plurality of computing systems of a plurality of fixed base operators associated with the airport;
entering a transportation request, by a pilot of the aircraft, at a service request and negotiation graphical user interface displayed on the hand-held computing device, wherein the transportation request is entered by selecting a type of vehicle, a pick up date and time, a drop off date and time, a gate of the airport for a pickup location, a gate of the airport for a drop off location, and a negotiation preference using a plurality of pre-configured drop down menus and a touch screen functionality in the graphical user interface;
identifying, by a processor unit of the hand held computing device, one or more fixed base operators associated with the airport that provide the type of requested service, wherein identifying the one or more fixed base operators includes performing a lookup of fixed base operators in a fixed base operator directory based on the type of the requested service;
transmitting, by the processor unit, a request for a quote on to each computing system of the one or more fixed base operators;
automatically negotiating, by the processor unit, with each computing system of the one or more fixed base operators based on one or more negotiation criteria until the processor unit determines a better deal on the transportation request will not be obtained, wherein the one or more negotiation criteria are identified in the transportation request, and wherein the one or more negotiation criteria include at least one of lowest cost, best delivery time, preferred service provider, and type of transportation;
responsive to a determination by the processor unit that the better deal on the transportation request is not obtainable, ranking quotes from the one or more fixed base operators based on the one or more negotiation criteria;
transmitting one or more advertisements for a subset of the one or more fixed base operators based on the ranking of quotes from the one or more fixed base operators, wherein the one or more advertisements include information obtained from the quotes from the one or more fixed base operators;
receiving an order from the hand held computing device based on a selection of an advertisement from the one or more advertisements; and
transmitting the order to a fixed base operator identified in the order.

* * * * *